(12) United States Patent
Geormezi et al.

(10) Patent No.: US 7,786,244 B2
(45) Date of Patent: *Aug. 31, 2010

(54) DEVELOPMENT AND CHARACTERIZATION OF NOVEL PROTON CONDUCTING AROMATIC POLYETHER TYPE COPOLYMERS BEARING MAIN AND SIDE CHAIN PYRIDINE GROUPS

(75) Inventors: Maria Geormezi, Patras (GR); Nora Gourdoupi, Patras (GR)

(73) Assignee: Advent Technologies (GR)

( * ) Notice: Subject to any disclaimer, the term of this patent is extended or adjusted under 35 U.S.C. 154(b) by 0 days.

This patent is subject to a terminal disclaimer.

(21) Appl. No.: 11/900,304

(22) Filed: Sep. 10, 2007

(65) Prior Publication Data

US 2008/0113227 A1 May 15, 2008

Related U.S. Application Data

(60) Provisional application No. 60/843,879, filed on Sep. 11, 2006.

(51) Int. Cl.
*C08G 61/02* (2006.01)
(52) U.S. Cl. .................. 528/86; 528/168; 528/172; 528/211; 525/390; 427/385.5; 429/12
(58) Field of Classification Search .................. 528/86
See application file for complete search history.

(56) References Cited

FOREIGN PATENT DOCUMENTS

| | | |
|---|---|---|
| DE | 198 32 838 | 2/1999 |
| DE | 100 19 732 A1 | 10/2001 |
| WO | WO 2004/034500 | 4/2004 |

OTHER PUBLICATIONS

Yasuda et al., Macromolecules, 2003, 36 (20), 7513-7519.*
Shu et al. Chem. Commun., 1350-1351, 2002.*
Daletou M K et al., "Proton conducting membranes based on blends of PBI with aromatic polyethers containing pyridine units", Journal of Membrane Science, vol. 252, No. 1-2, Jan. 1, 2003, pp. 115-122, XP009103762.
Wenmiao Shu, et al., "Intramolecular hydrogen bond assisted planarization and self-assembly of simple disc-shaped molecules in mesophases", Chemical Communications, 2002, pp. 1350-1351, XP002494802.
International Search Report for Related International Application PCT/IB2007/004485, 2005
Written Opinion for Related International Application PCT/IB2007/004485, 2005.

* cited by examiner

*Primary Examiner*—Randy Gulakowski
*Assistant Examiner*—Shane Fang
(74) *Attorney, Agent, or Firm*—Edwards Angell Palmer & Dodge LLP; Peter F. Corless; Lisa Swiszcz

(57) ABSTRACT

Featured are novel heterocycle substituted hydroquinones, aromatic copolymers and homopolymers bearing main and side chain polar pyridine units. These polymers exhibit good mechanical properties, high thermal and oxidative stability, high doping ability and high conductivity values. These novel polymers can be used in the preparation and application of MEA on PEMFC type single cells. The combination of the above mentioned properties indicate the potential of the newly prepared materials to be used as electrolytes in high temperature PEM fuel cells.

18 Claims, 9 Drawing Sheets

DEVELOPMENT AND CHARACTERIZATION OF NOVEL PROTON CONDUCTING AROMATIC POLYETHER TYPE COPOLYMERS BEARING MAIN AND SIDE CHAIN PYRIDINE GROUPS

CROSS REFERENCE TO RELATED APPLICATION

This application claims priority to and the benefit of Provisional U.S. Application Ser. No. 60/843,879, filed Sep. 11, 2006, the entire contents of which are incorporated by reference.

FIELD OF INVENTION

This invention is related to the development of new aromatic copolymers bearing main and side chain polar pyridine units. Characterization of all prepared polymer materials, was performed using size exclusion chromatography, thermal and mechanical analysis. The copolymers present excellent film forming properties, high glass transition temperature up to 270° C. and high thermal and oxidative stability up to 480° C. The polar pyridine groups throughout the polymeric chains enable high acid uptake (800 wt %) resulting in highly ionic conductive membranes in the conductivity range of $10^{-2}$ S/cm. The combination of the above mentioned properties confirm the potential of the new prepared materials to be used as electrolytes in high temperature PEM fuel cells.

BACKGROUND INFORMATION

Proton exchange membrane fuel cells (PEMFC) have attracted considerable attention as promising power generators for automotive, stationary, as well as portable power, due to their high-energy efficiency and low emissions. The membrane is one of the key components in the design of improved polymer electrolyte membrane fuel cells. It has three main functions as electrolyte medium for ion conduction and electrode reactions, as a barrier for separating reactant gases, and as the support for electrode catalysts. An applicable PEMFC membrane should possess high ionic conductivity, low electronic conductivity, good chemical, thermal and oxidative stability as well good mechanical properties. Current technologies are based on sulfonated membranes, such as Nafion, although it is not suitable at high temperatures or under low relative humidity conditions. Also, its methanol crossover and high cost have still to be overcome for commercialization. Current research on PEMFCs is focused on the optimization of a device working at operational temperatures above 100° C. and at very low humidity levels. Operation of the fuel cells at elevated temperatures has the benefits of reducing CO poisoning of the platinum electrocatalyst and increased reaction kinetics. In this respect, new polymeric materials have been synthesized in order to replace Nafion. One of the most successful high temperature polymer membranes developed so far is the phosphoric acid-doped Polybenzimidazole (PBI). Apart from high thermal stability and good membrane-forming properties, PBI contains basic functional groups which can easily interacts with strong acids, such as $H_3PO_4$ and $H_2SO_4$, allowing proton migration along the anionic chains. Even though PBI membranes show high proton conductivity at high temperature (>100° C.) under low relative humidity conditions and have a high CO tolerance, they exhibit low oxidative stability and moderate mechanical properties. Beside Polybenzimidazole (PBI), there is a significant research effort nowadays towards the development of some novel polymeric materials, which fulfill the prerequisites for use in high temperature PEMFCs. Poly(2,5-benzimidazole) (ABPBI) is an alternative benzimidazole type polymer with thermal stability and conducting properties as good as those of PBI. On the other hand, high-temperature aromatic polyether type copolymers containing basic groups like PBI enable formation or complexes with stable acids and exhibit high thermal, chemical stability and good conducting properties in order to be used in high temperature PEMFCs.

Prior art related to methods of making membrane electrode assemblies covers issues in the following areas: (i) direct membrane catalyzation, (ii) catalyzation of coated electrode substrates, (iii) need for effecting membrane electrode bonding for seamless proton transport (iv) effective solubility of reactant gases (in particular oxygen), (v) use of pore forming agents for effective gas transport within the electrode structure. Prior art literature relates to the specific objective of enhancing mass transport and the ability to operate a fuel cell on a sustained higher power density level.

In the context of prior art, direct catalyzation of the membrane has been described in various patents and scientific literature primarily on aqueous based polymer electrolytes, most notably of the perfluorinated sulfonic acid type. At the current state of the technology, prior efforts together with current approaches have to be tempered with the ability to translate developments in this regard to mass manufacturability while keeping reproducibility (batch vs. continuous) and cost in perspective. Depending on the deposition methods used, the approach towards lowering noble metal loading can be classified into five broad categories, (i) thin film formation with carbon supported electrocatalysts, (ii) pulse electrodeposition of noble metals (Pt and Pt alloys), (iii) sputter deposition (iv) pulse laser deposition, and (v) ion-beam deposition. While the principal aim in all these efforts is to improve the charge transfer efficiency at the interface, it is important to note that while some of these approaches provide for a better interfacial contact allowing for efficient movement of ions, electrons and dissolved reactants in the reaction zone, others additionally effect modification of the electrocatalyst surface (such as those rendered via sputtering, electrodeposition or other deposition methods).

In the first of the five broad categories using the 'thin film' approach in conjunction with conventional carbon supported electrocatalysts, several variations have been reported, including (a) the so called 'decal' approach where the electrocatalyst layer is cast on a PTFE blank and then decaled on to the membrane (Wilson and Gottesfeld 1992; Chun, Kim et al. 1998). Alternatively an 'ink' comprising of Nafion® solution, water, glycerol and electrocatalyst is coated directly on to the membrane (in the $Na^+$ form) (Wilson and Gottesfeld 1992). These catalyst coated membranes are subsequently dried (under vacuum, 160° C.) and ion exchanged to the $H^+$ form (Wilson and Gottesfeld 1992). Modifications to this approach have been reported with variations to choice of solvents and heat treatment (Qi and Kaufman 2003; Xiong and Manthiram 2005) as well as choice of carbon supports with different microstructure (Uchida, Fukuoka et al. 1998). Other variations to the 'thin film' approach have also been reported such as those using variations in ionomer blends (Figueroa 2005), ink formulations (Yamafuku, Totsuka et al. 2004), spraying techniques (Mosdale, Wakizoe et al. 1994; Kumar and Parthasarathy 1998), pore forming agents (Shao, Yi et al. 2000), and various ion exchange processes (Tsumura, Hitomi et al. 2003). At its core this approach relies on extending the reaction zone further into the electrode structure away from the membrane, thereby providing for a more three dimensional zone for charge transfer. Most of the variations reported above thereby enable improved transport of ions, electrons and dissolved reactant and products in this 'reaction layer' motivated by need to improve electrocatalyst utilization. These attempts in conjunction with use of Pt alloy electrocatalysts have formed the bulk of the current state of the art in the PEM fuel cell technology. Among the limitations of this approach are problems with controlling the Pt particle size (with loading on carbon in excess of 40%), uniformity of deposition in large scale production and cost (due to several complex processes and/or steps involved).

An alternative method for enabling higher electrocatalyst utilization has been attempted with pulse electrodeposition. Taylor et al., (Taylor, Anderson et al. 1992) one of the first to report this approach used pulse electrodeposition with Pt salt solutions which relied on their diffusion through thin Nafion® films on carbon support enabling electrodeposition in regions of ionic and electronic contact on the electrode surface. See a recent review on this method by Taylor et al., describing various approaches to pulse electrodeposition of catalytic metals (Taylor and Inman 2000). In principal this methodology is similar to the 'thin film' approach described above, albeit with a more efficient electrocatalyst utilization, since the deposition of electrocatalysts theoretically happens at the most efficient contact zones for ionic and electronic pathways. Improvements to this approach have been reported such as by Antoine and Durand (Antoine and Durand 2001) and by Popov et al., (Popov 2004). Developments in the pulse algorithms and cell design have enabled narrow particle size range (2-4 nm) with high efficiency factors and mass activities for oxygen reduction. Though attractive, there are concerns on the scalability of this method for mass scale manufacturing.

Sputter deposition of metals on carbon gas diffusion media is another alternative approach. Here however, interfacial reaction zone is more in the front surface of the electrode at the interface with the membrane. The original approach in this case was to put a layer of sputter deposit on top of a regular Pt/C containing conventional gas diffusion electrode. Such an approach (Mukerjee, Srinivasan et al. 1993) exhibited a boost in performance by moving part of the interfacial reaction zone in the immediate vicinity of the membrane. Recently, Hirano et al. (Hirano, Kim et al. 1997) reported promising results with thin layer of sputter deposited Pt on wet proofed non catalyzed gas diffusion electrode (equivalent to 0.01 $mg_{Pt}/cm^2$) with similar results as compared to a conventional Pt/C (0.4 $mg_{Pt}/cm^2$) electrode obtained commercially. Later Cha and Lee (Cha and Lee 1999), have used an approach with multiple sputtered layers (5 nm layers) of Pt interspersed with Nafion®-carbon-isopropanol ink, (total loading equivalent of 0.043 $mg_{Pt}/cm^2$) exhibiting equivalent performance to conventional commercial electrodes with 0.4 $mg_{Pt}/cm^2$. Huag et al. (Haug 2002) studied the effect o substrate on the sputtered electrodes. Further, O'Hare et al., on a study of the sputter layer thickness has reported best results with a 10 nm thick layer. Further, significant advancements have been made with sputter deposition as applied to direct methanol fuel cells (DMFC) by Witham et al. (Witham, Chun et al. 2000; Witham, Valdez et al. 2001) wherein several fold enhancements in DMFC performance was reported compared to electrodes containing unsupported PtRu catalyst. Catalyst utilization of 2,300 mW/mg at a current density of 260 to 380 $mA/cm^2$ was reported (Witham, Chun et al. 2000; Witham, Valdez et al. 2001). While the sputtering technique provides for a cheap direct deposition method, the principal drawback is the durability. In most cases the deposition has relatively poor adherence to the substrate and under variable conditions of load and temperature, there is a greater probability of dissolution and sintering of the deposits.

An alternative method dealing direct deposition was recently reported using pulsed laser deposition (Cunningham, Irissou et al. 2003). Excellent performance was reported with loading of 0.017 mgPt/cm2 in a PEMFC, however this was only with the anode electrodes, no cathode application has been reported to date.

However, in all these new direct deposition methodologies, mass manufacturability with adequate control on reproducibility remains questionable at best. In this regard the methodologies developed by 3 M company is noteworthy, where mass manufacture of electrodes with low noble metal loading is reported (Debe, Pham et al. 1999; Debe, Poirier et al. 1999). A series of vacuum deposition steps are involved with adequate selection of solvents and carbon blacks resulting in nanostructured noble metal containing carbon fibrils which are embedded into the ionomer-membrane interface (Debe, Haugen et al. 1999; Debe, Larson et al. 1999).

An alternative is the use of ion-beam techniques, where the benefits of low energy ion bombardment concurrent to thin film vacuum deposition (electron beam) process is exploited for achieving dense, adhering and robust depositions (Hirvonen 2004). This method has been recently reviewed (Hirvonen 2004) in terms of both mechanisms of ion/solid interactions during thin film growth as well as development of various protocols for specific application areas, including tribology, anti corrosion coatings, superconducting buffer layers and coatings on temperature sensitive substrates such as polymers. Modifications of this approach to prepare 3-D structures including overhang and hollow structures have also been recently reported (Hoshino, Watanabe et al. 2003). Use of dual anode ion source for high current ion beam applications has also been reported recently (Kotov 2004), where benefits for mass production environment is discussed.

It thus would be desirable to provide a method for improving the catalyst utilization at the interface of a polymer electrolyte imbibed with ion conducting components (such as phosphoric, polyphosphoric and analogs of perfluorinated sulfonic acids) so as to enable higher power densities (i.e., 400 $mW/cm^2$ at 0.5 V vs. RHE, 170-180° C., $H_2$/Air). It would also be desirable to provide improved power density attained with lower Pt loading (0.3 to 0.4 $mg/cm^2$) as compared to the current state of the art which is in the range 0.5 to 1.0 $mg/cm^2$, thus providing for a better gravimetric energy density. It would be further desirable to provide an improved ability to retain ion conducting elements (such as phosphoric, polyphosphoric and analogs of perfluorinated sulfonic acids) within the reaction layer (catalyst containing zone at the interface between the electrode and the membrane). It would be particularly desirable from the perspective of long term sustained power density as well as better tolerance to both load and thermal cycling (especially transitions to below the condensation zone).

SUMMARY OF THE INVENTION

The present invention is related to the development of new heterocycle substituted hydroquinones, aromatic copolymers and homopolymers bearing main and side chain polar pyridine units. These polymers exhibit good mechanical properties, high thermal and oxidative stability, high doping ability and high conductivity values. The invention further relates to the preparation and application of MEA on PEMFC type single cells. The combination of the above mentioned properties indicate the potential of the newly prepared materials to be used as electrolytes in high temperature PEM fuel cells.

BRIEF DESCRIPTION OF THE DRAWINGS

For a fuller understanding of the nature and desired objects of the present invention, reference is made to the following detailed description taken in conjunction with the accompanying drawing figures wherein.

DEFINITIONS

Figure 1:
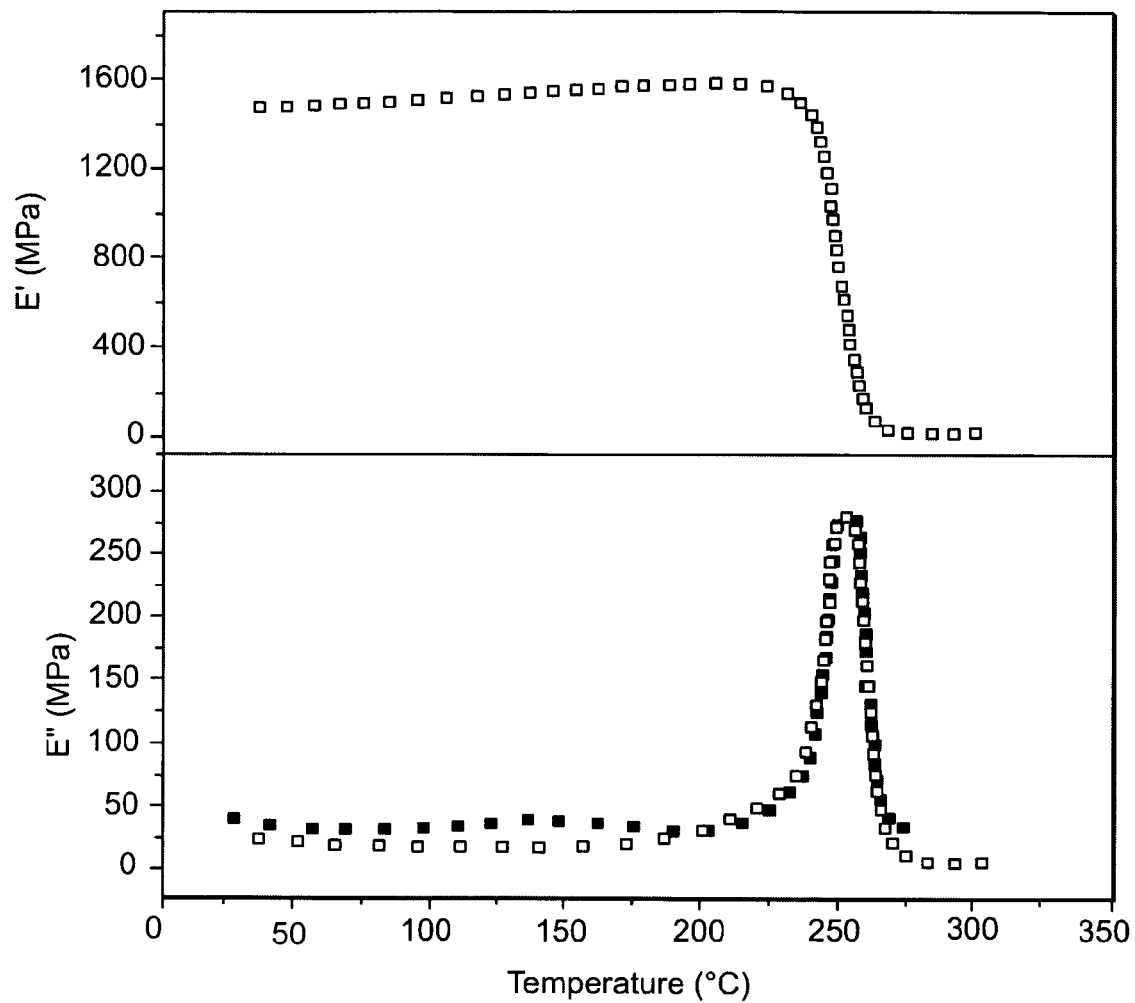
FIG. 1 shows temperature dependence of the storage (E') and loss (E") modulus of copolymer dPPy(50)coPPyPES before (■) and after (□) the treatment with $H_2O_2$.

The following definitions are for convenient reference with respect to the following description and are not to be construed in a limiting manner.

The term Gel Permeation Chromatography ("GPC") shall be understood to mean or refer to a method or technique used in order to determine the molecular weight (Mn and Mw) and dispersity of the polymers.

The term Nuclear Magnetic Resonance ("NMR") shall be understood to mean or refer to a method or technique used in order to identify the chemical and molecular structure of the polymers and the proportion of the monomers in the copolymers.

The term Dynamic Mechanical Analysis ("DMA") shall be understood to mean or refer to a method or technique used in order to identify the Tg (glass transition temperature) of the polymers.

The term Thermogravimetric Analysis ("TGA") shall be understood to mean or refer to a method or technique used in order to study the thermal, and oxidative stability before and after Fenton's test.

The term Fenton's Test shall be understood to mean or refer to a method or technique used in order to study and determine the oxidative stability of the polymers.

The term Four Prove Technique shall be understood to mean or refer to a method or technique used in order to study the dependence of the ionic conductivity on high doping levels versus temperature as well as the dependence of the ionic conductivity versus doping level.

DETAILED DESCRIPTION OF THE INVENTION

Polymer Membrane Electrolyte

The present invention relates to the development and characterization of new polymeric materials (structures 1 and 2) comprising copolymers and homopolymers bearing main and side chain pyridine and pyrimidine groups and different aromatic difluorides and blends thereof. The polymer structures are given below.

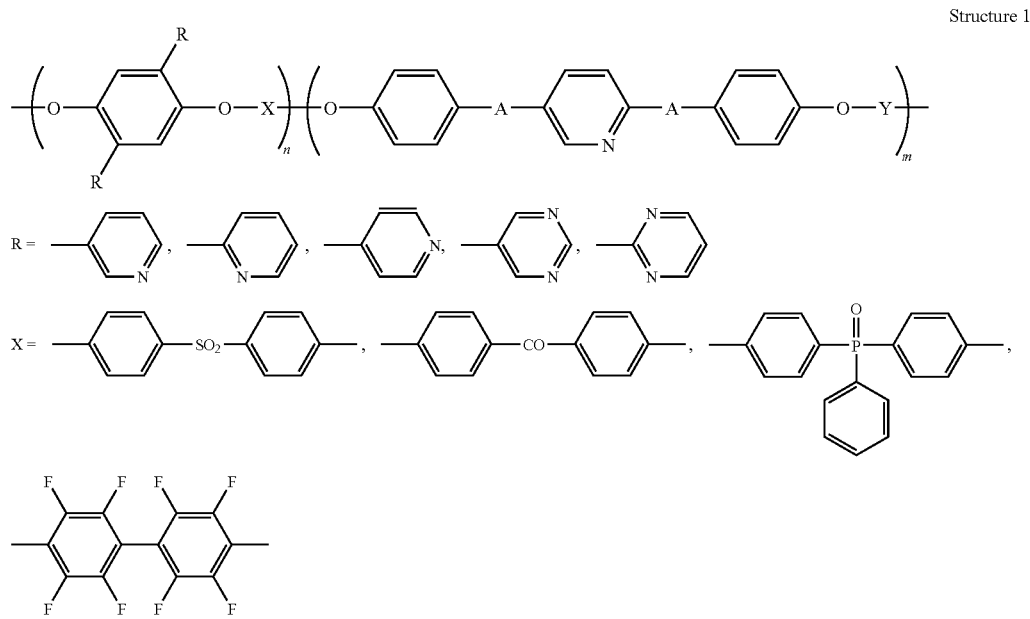

Structure 1

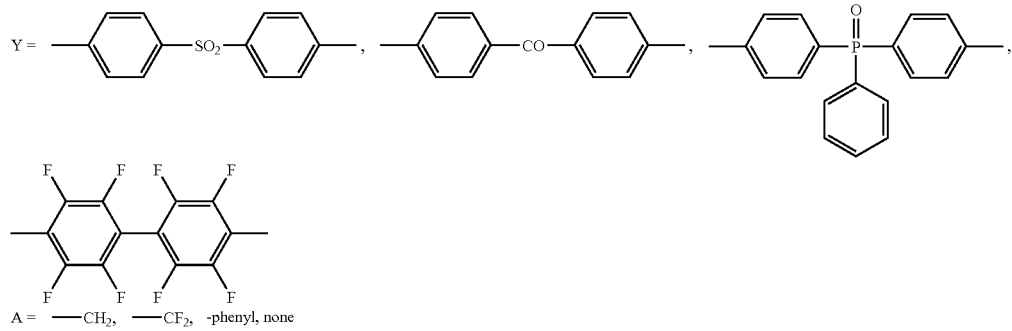

Structure 2

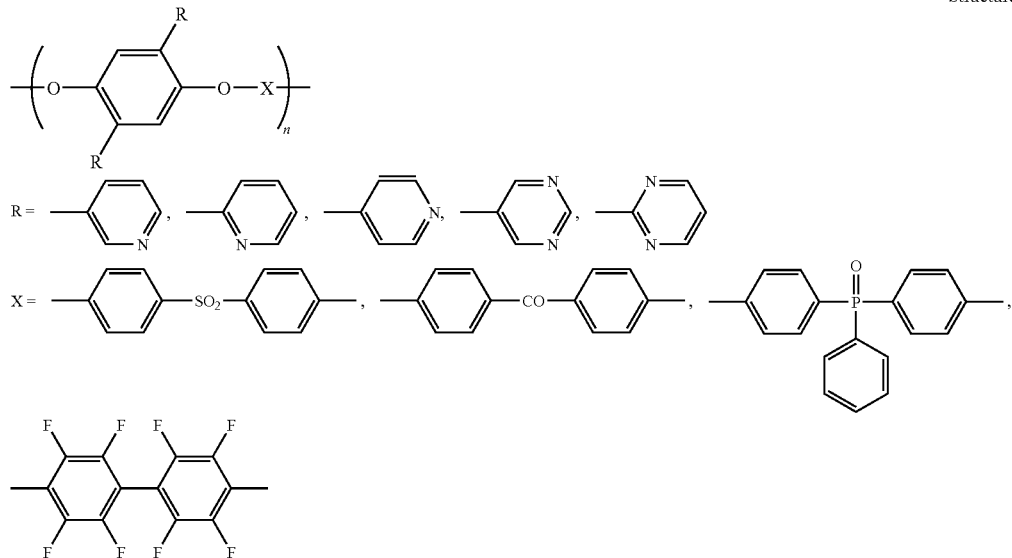

For the purpose of the present invention, aromatic polyethers bearing main and side chain pyridine units are preferable. The membranes are composed of copolymers (copolymers 1 and 2) and homopolymers (homopolymers 1 and 2). The polymer structures are given below. x is the content of the side chain pyridine into the polymer main chain.

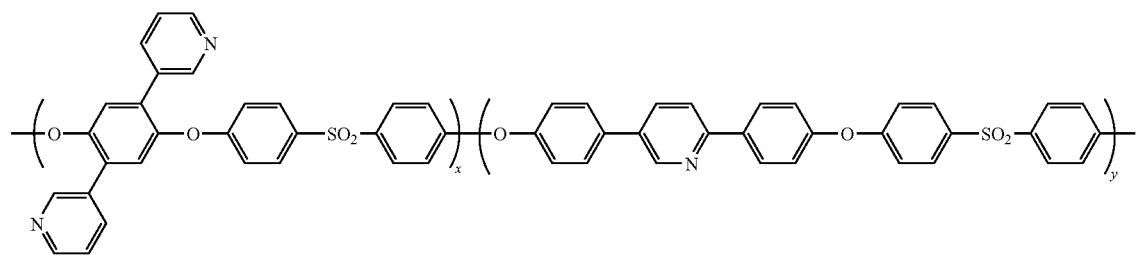

copolymer 1: dPPy(x)coPPyPES

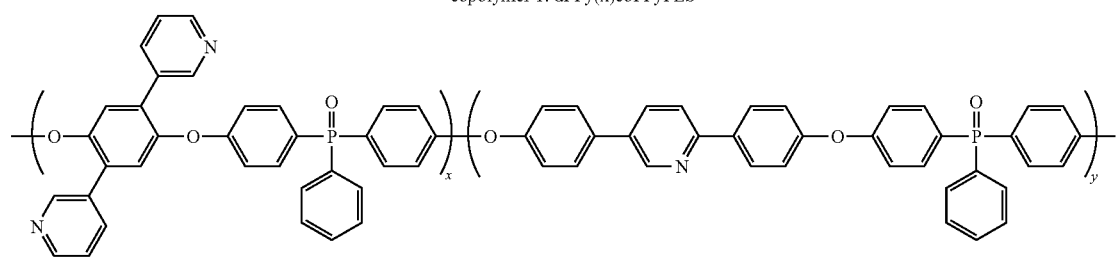

copolymer 2: dPPy(x)coPPyPO

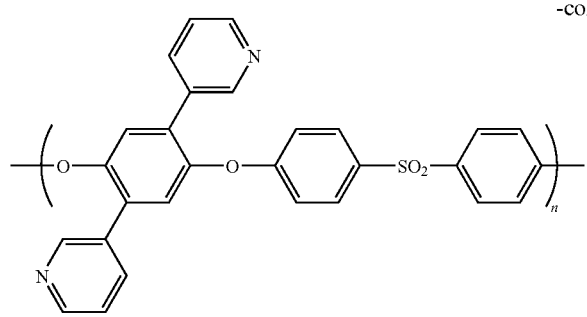

homopolymer 1: dPPyPES

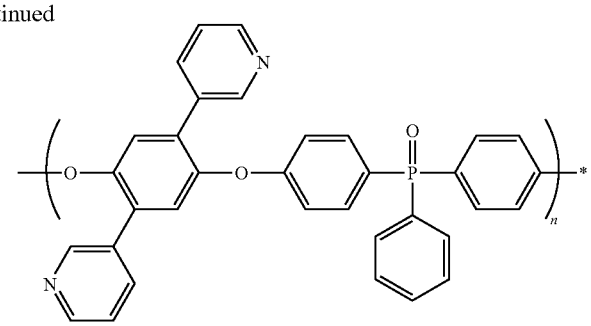

homopolymer 2: dPPyPO

Figure 2:
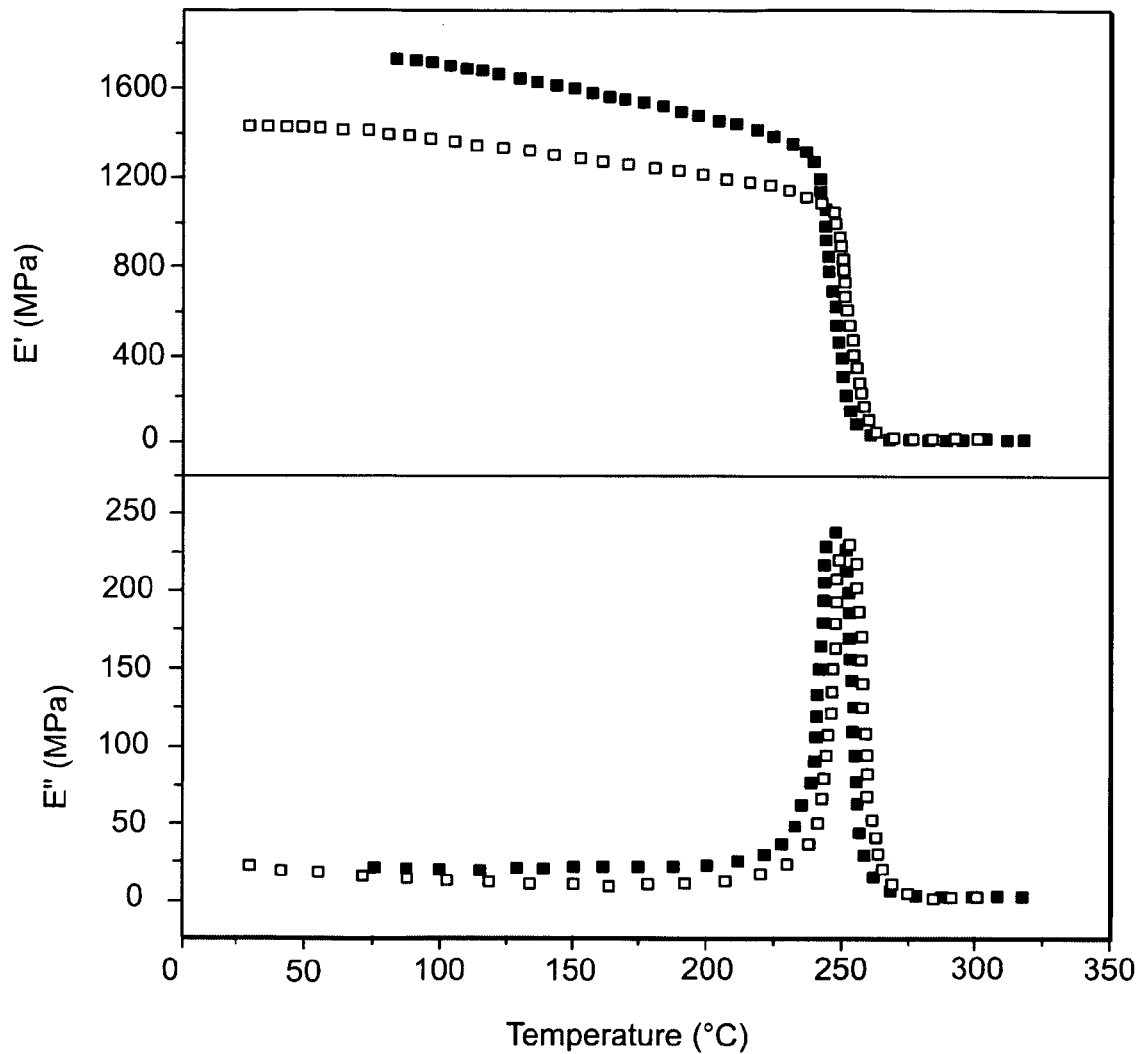
FIG. 2 shows temperature dependence of the storage (E') and loss (E") modulus of copolymer dPPy(50)coPPyPO before (■) and after (□) the treatment with $H_2O_2$.
Figure 3:
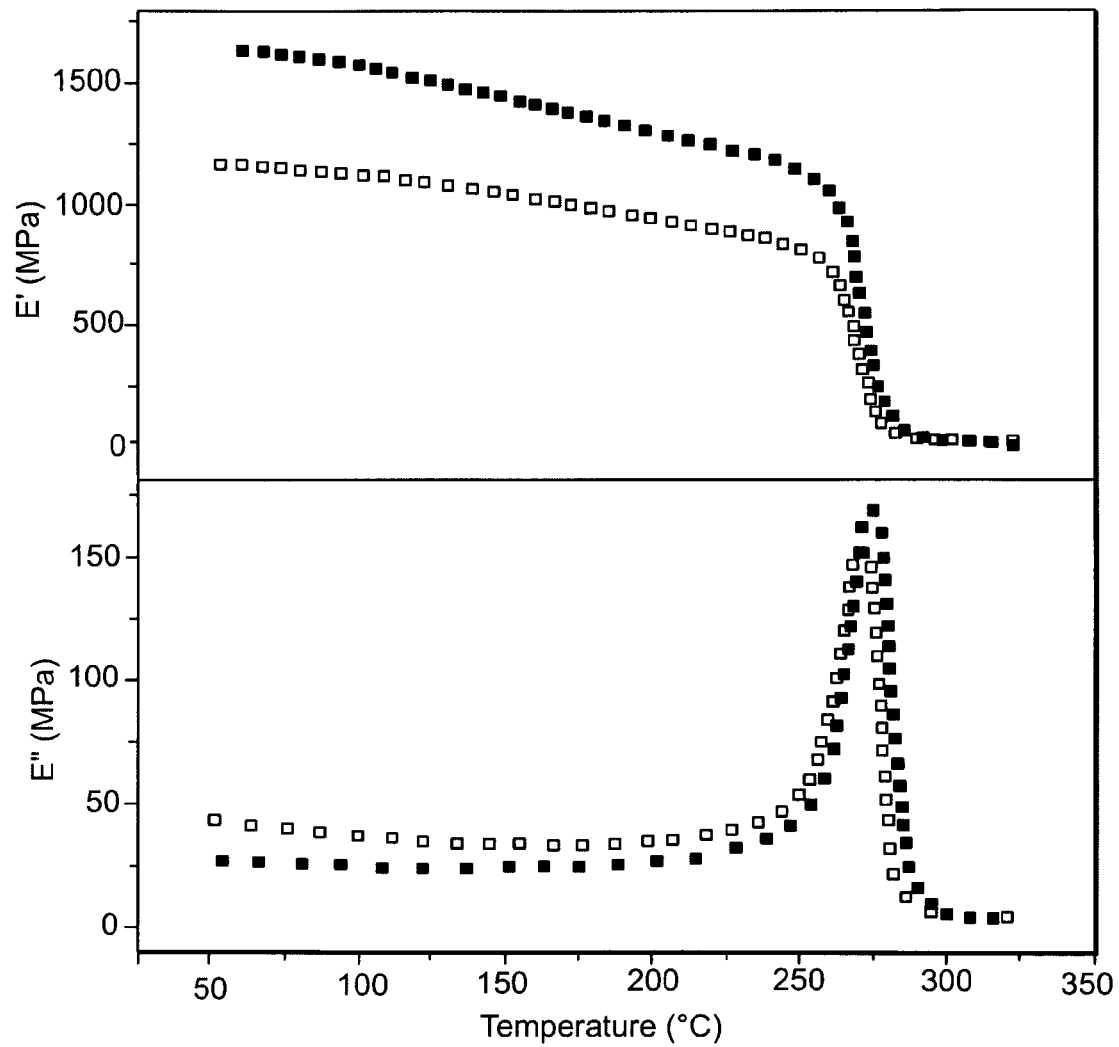
FIG. 3 shows temperature dependence of the storage (E') and loss (E") modulus of copolymer dPPy(10)coPPyPO before (■) and after (□) the treatment with $H_2O_2$.
Figure 4:
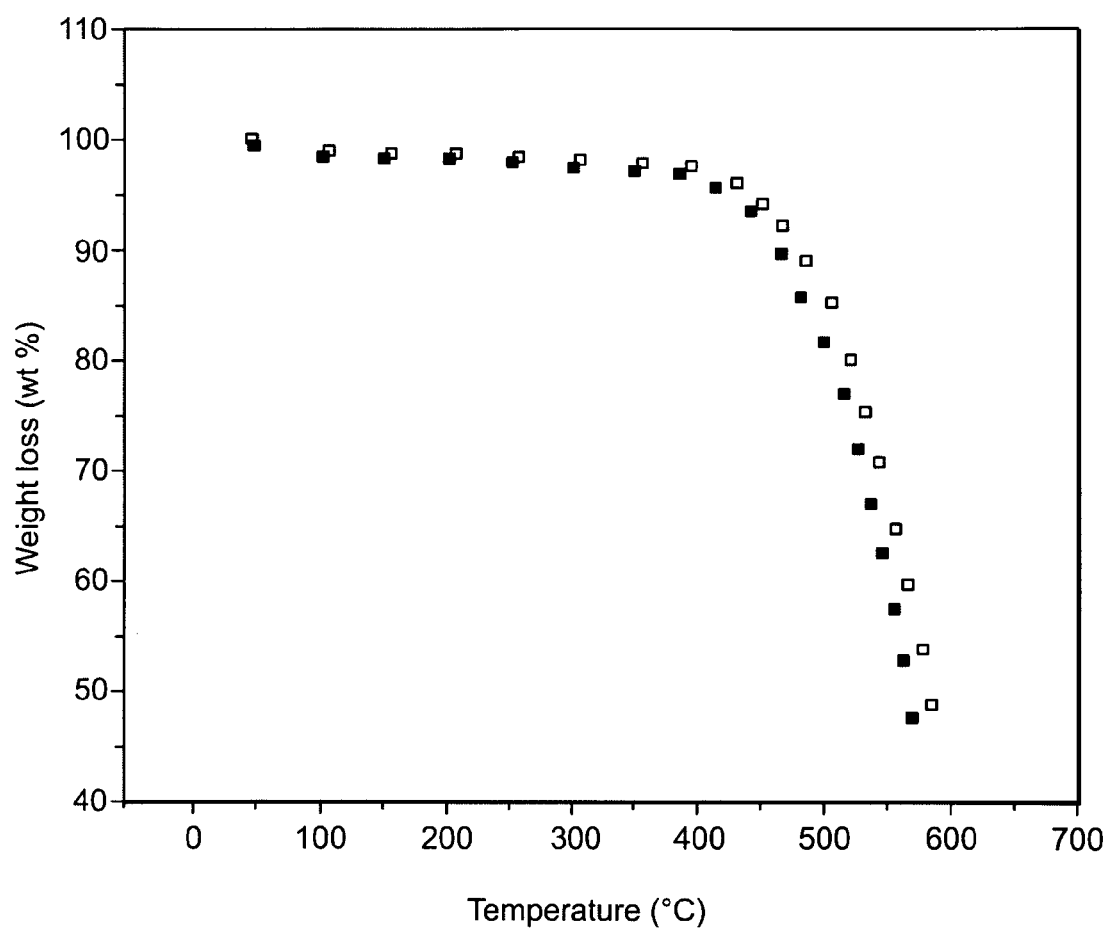
FIG. 4 shows thermogravimetric analysis of dPPy(50)coPPyPES before (■) and after (□) the treatment with $H_2O_2$.
Figure 5:
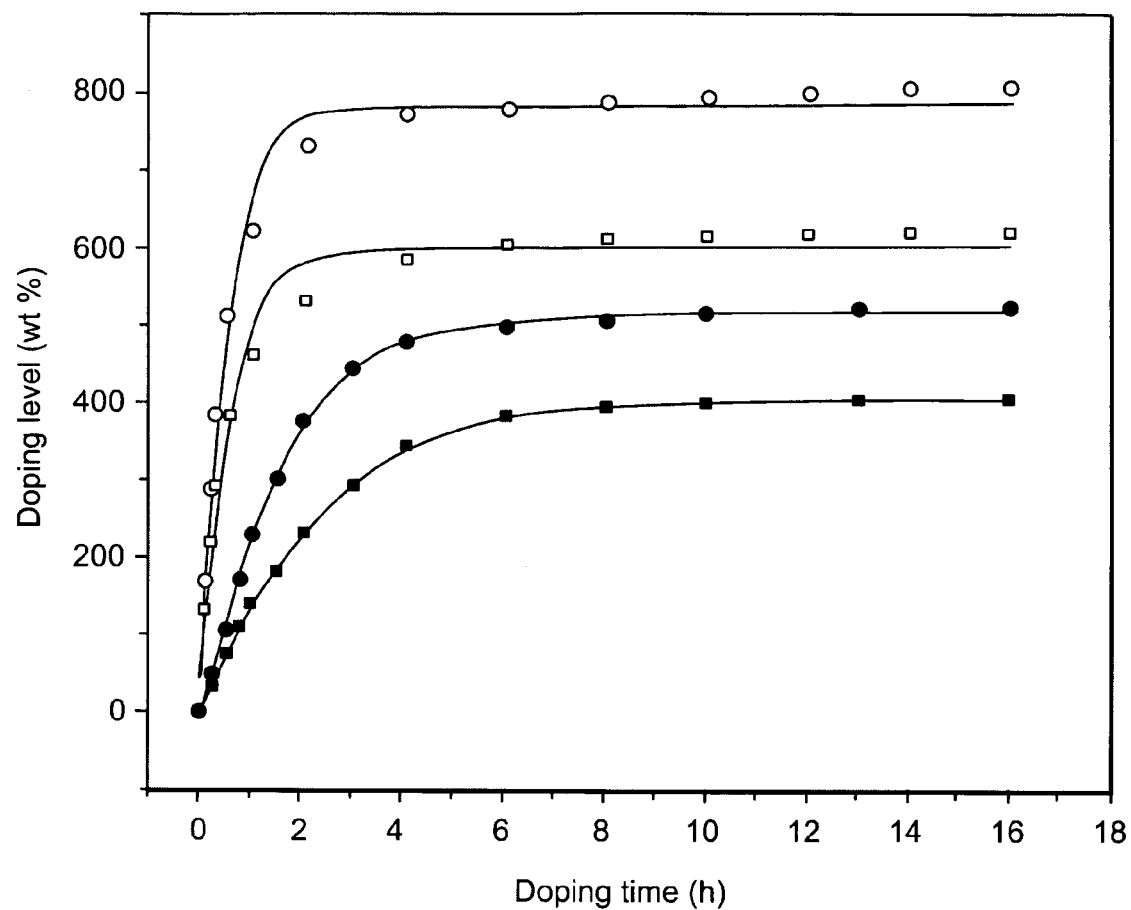
FIG. 5 shows time dependence of doping level (wt %) of dPPy(40)coPPyPES at 25° C. (■) and 50° C. (□) and of dPPy(50)coPPyPES at 25° C. (•) and 50° C. (○)
Figure 6:
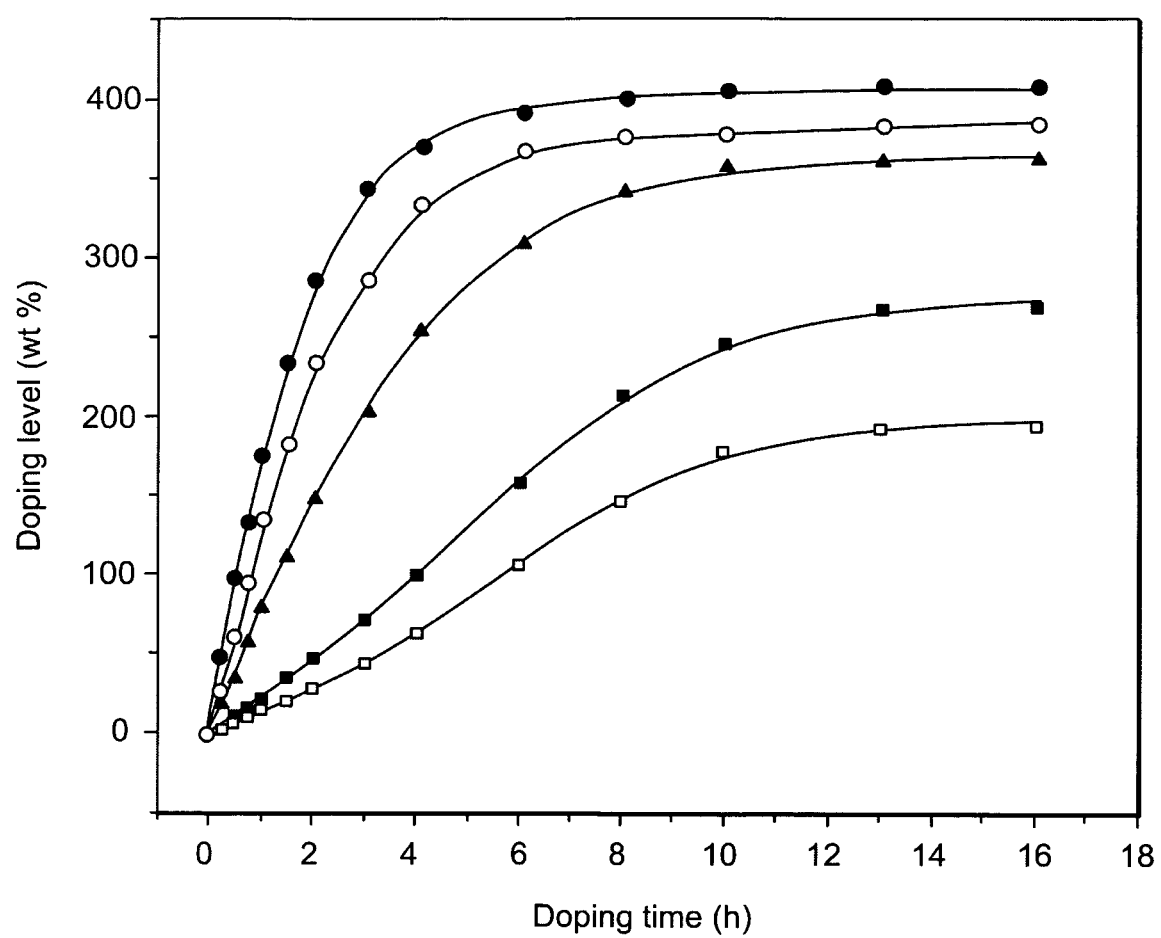
FIG. 6 shows time dependence of doping level (wt %) of dPPy(10)coPPyPO(□), dPPy(20)coPPyPO(■), dPPy(30)coPPyPO(▲), dPPy(40)coPPyPO(○), dPPy(50)coPPyPO (•) at 25° C.
Figure 7:
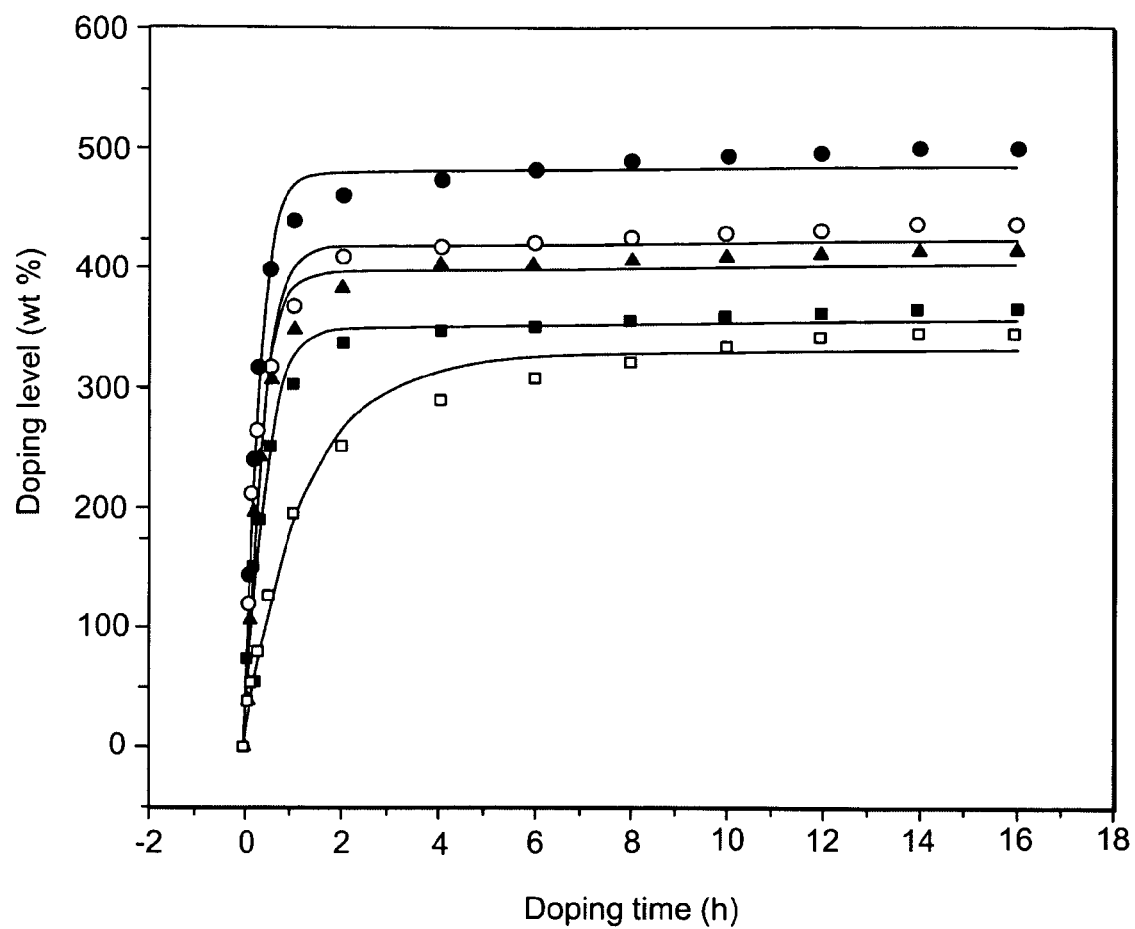
FIG. 7 shows time dependence of doping level (wt %) of PPy(10)coPPyPO(□), dPPy(20)coPPyPO(■), dPPy(30)coPPyPO (▲), dPPy(40)coPPyPO(○), dPPy(50)coPPyPO (•) at 50° C.
Figure 8:
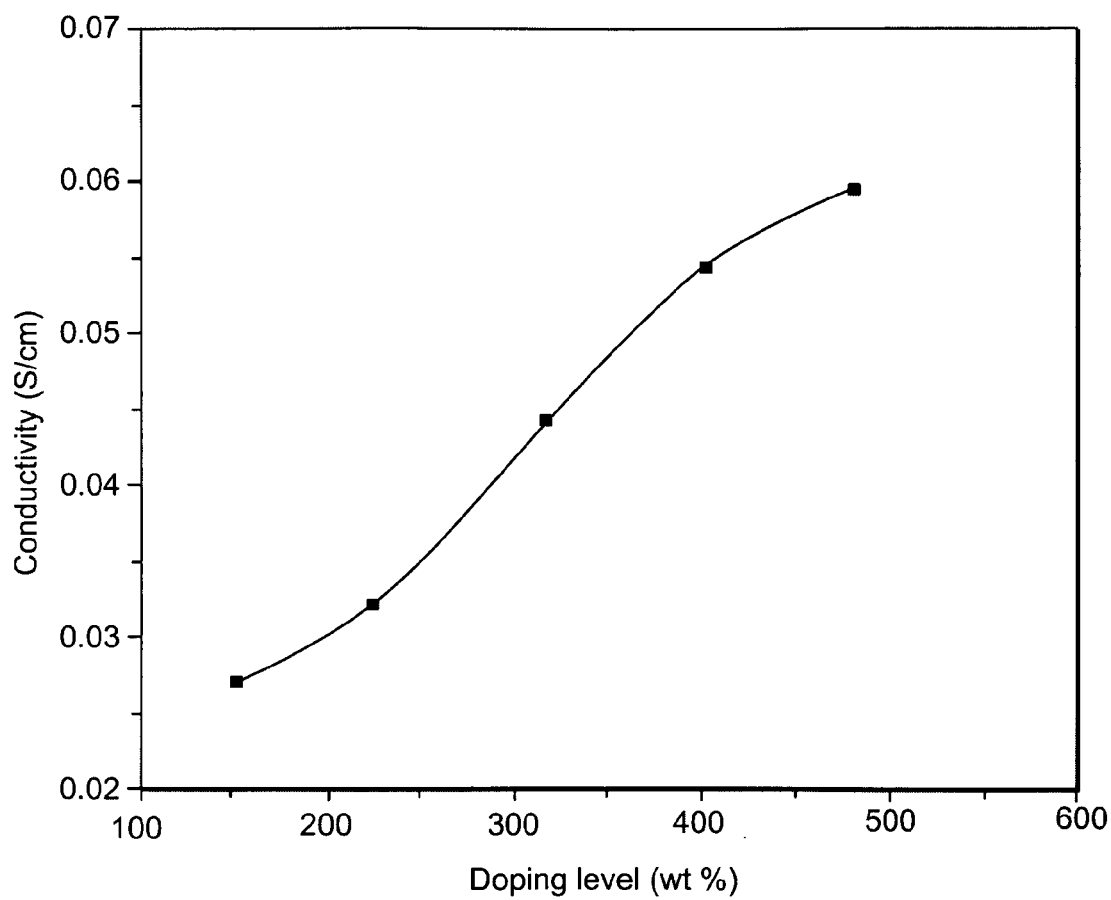
FIG. 8 shows doping level dependence of ionic conductivity of dPPy(50)coPPyPES at room temperature.
Figure 9:
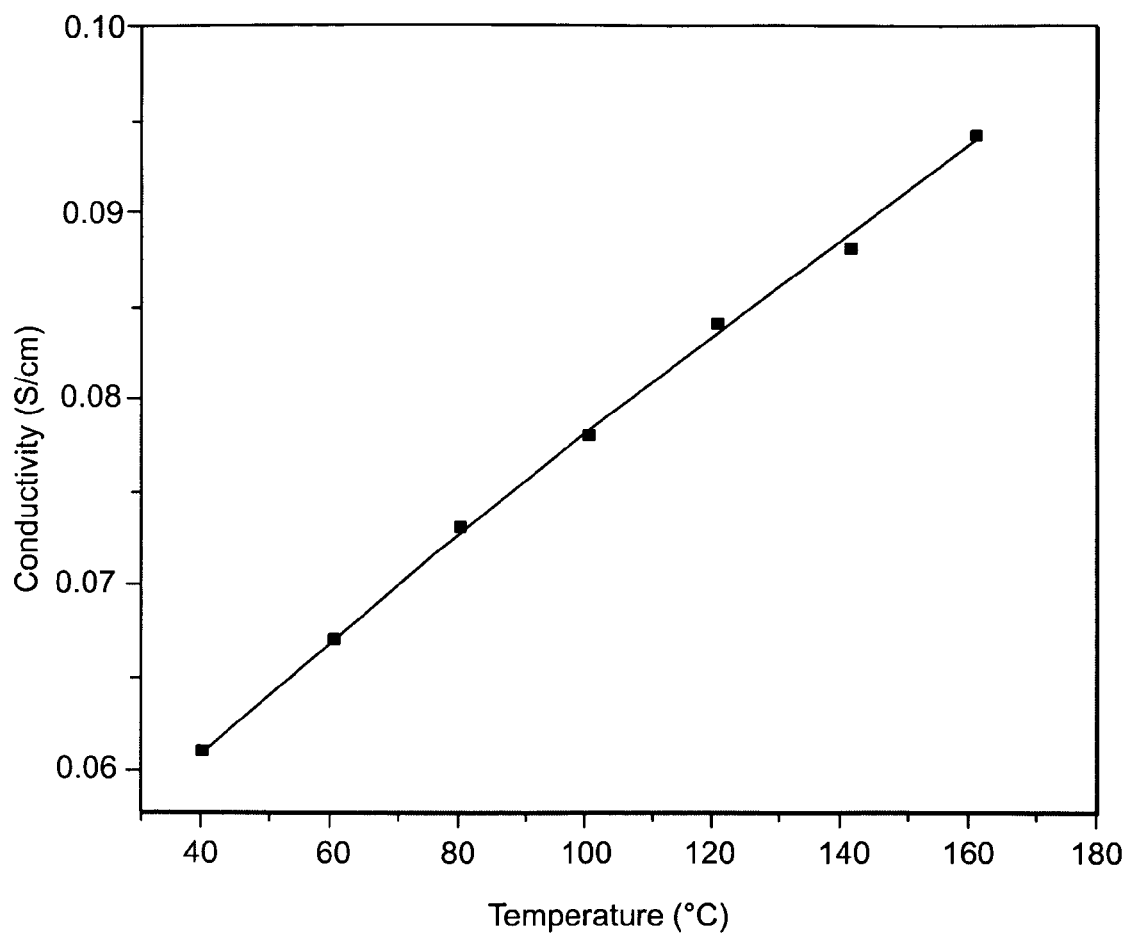
FIG. 9 shows temperature dependence of ionic conductivity of acid doped dPPy(50)coPPyPES with a doping level 480 wt % $H_3PO_4$ and relative humidity 60%.

The above polymers are easily doped with inorganic acids such as phosphoric acid resulting in ionically conducting membranes. These copolymers exhibit glass transition temperature in the range of about 245° C.-270° C. depending on the structure and the copolymer composition. The oxidative stability of the copolymers can be examined with dynamic mechanical analysis and thermogravimetric analysis. As shown in FIGS. 1-3, the copolymers retain their flexibility and mechanical integrity both before and after treatment. The chemical, thermal and oxidative stability of the copolymers can be examined using the Fenton's test. Membrane samples are immersed into 3 wt % $H_2O_2$ aqueous solution containing 4 ppm $FeCl_2 \times 4H_2O$ at 80° C. for 72 h. FIG. 4 illustrates the weight of dry samples before and after experimentation. As shown, the blend membranes retain their mechanical integrity and their high thermal stability. As shown in FIGS. 5-7, in order to obtain the maximum doping level, the membranes are immersed into 85 wt % phosphoric acid solution at different temperatures and for different doping times depending on the membrane composition. The wet membranes are wiped dry and quickly weighed again. The acid uptake of membranes is defined as the weight percent of the acid per gram of the copolymer. As the doping temperature increases the phosphoric acid doping level also increases reaching plateau values of around 800 wt % $H_3PO_4$ doping level for the copolymer 1 at 50° C. FIG. 8 illustrates the doping dependence of the conductivity of a sample of copolymer 1 doped with phosphoric acid. FIG. 9 illustrates the effect of temperature of the conductivity of copolymer 1 doped with 480 wt % phosphoric acid. As shown, the conductivity increases as temperature increases. At 160° C. the conductivity reached a value of $5.9 \times 10^{-2}$ S/cm even at room temperature.

The present invention relates to a method for implementing membrane electrode assemblies using the new polymer electrolytes as described herein. The method for implementing of membrane electrode assembly includes (a) a gas diffusion and current collecting electrode component, (b) a reaction layer component comprising of a catalyst and ion conducting elements in conjunction with crosslinkers, and (c) Pt alloy electrocatalysts for enhanced CO tolerance and oxygen reduction reaction activity.

The Gas Diffusion Electrode Component

The electrically conducting substrate is selected from a combination of woven carbon cloth (such as Toray fiber T-300) or paper (such as the Toray TGP-H-120), previously wet-proofed using TFE based solutions (DuPont, USA). The typical porosity of this carbon substrate is between 75-85%. The wet proofing is achieved with a combination of dip coating for fixed duration (between 30 secs to 5 mins) followed with drying in flowing air. Such a wet proofed substrate can be coated with a gas diffusion layer comprising of select carbon blacks and PTFE suspension. The choice of carbon blacks used in this layer range from Ketjen black to turbostratic carbons such as Vulcan XC-72 (Cabot Corp, USA) with typical surface areas in the range of 250 to 1000 $m^2/gm$. The deposition can be applied with a coating machine such as Gravure coaters from Euclid coating systems (Bay City, Mich., USA). A slurry composition comprising of carbon black and PTFE (poly tetrafluoro ethylene) in aqueous suspension (such as Dupont TFE-30, Dupont USA) is applied to a set thickness over the carbon paper or cloth substrate with the aid of the coating machine. Typical thickness of 50-500 microns is used. Pore forming agents are used to prepare this diffusion layer on the carbon conducting paper or cloth substrate. Careful control of the pore formers which consist of various combinations of carbonates and bicarbonates (such as ammonium and sodium analogs) affords control of gas access to the reaction zone. This is achieved by incorporation of these agents in the slurry mixture comprising of carbon black and PTFE suspension. Typical porosity rendered in this fashion differs from anode and cathode electrode and is in the range of 10-90%. Coated carbon substrates containing the gas diffusion layers are sintered to enable proper binding of components. This can be achieved using thermal treatment to temperatures significantly above the glass transition point for PTFE, usually in the range 100 to 350° C. for 5 to 30 minutes.

Formation of Reaction Layer Comprising of Electrocatalyst and Ion Conducting Components On the surface of the above mentioned gas diffusion layer, an additional layer comprising of a carbon supported catalyst, ion conducting elements (such as phosphoric acid, polyphosphoric acid or perfluoro sulfonic acid analogs), pore forming agents, and binder (such as PTFE, using TFE-30 dispersion, from Dupont, USA) is added using a variety of methods comprising of spraying, calendaring and or screen printing.

Typical steps first include appropriate choice of the electrocatalyst based on anode or cathode electrodes. For the Anode, Pt in conjunction of another transition metal such as Ru, Mo, Sn is used. This is motivated by the formation of oxides on these non noble transition metals at lower potentials to enable oxidation of CO or other $C_1$ moieties which are typical poisons in the output feed of fuel reformers (steam reformation of natural gas, methanol, etc.). The choice of electrocatalyst included Pt and second transition element either alloyed or in the form of mixed oxides. The choice is dependant on the application based on choice of fuel feedstock. The electrocatalysts are in the form of nanostructured metal alloys or mixed oxide dispersions on carbon blacks (turbostratic carbon support materials usually Ketjen black or similar material).

For the cathode, electrocatalysts which are relatively immune from anion adsorption and oxide formation are preferred. The choice of the alloying element ranges between available first row transition elements, typically Ni, Co, Cr, Mn, Fe, V, Ti, etc. Recent studies have shown that adequate alloying of these transition elements with Pt results in deactivation of Pt for most surface processes (lowering of surface workfunction) (Mukerjee and Urian 2002; Teliska, Murthi et al. 2003; Murthi, Urian et al. 2004; Teliska, Murthi et al. 2005). This renders the surface largely bare for molecular oxygen adsorption and subsequent reduction. Lowering anion adsorption such as phosphate anion for a phosphoric acid based ion conductor enables enhanced oxygen reduction kinetics. In addition to choice of alloys, the use of perfluorosulfonic acids either alone or as a blend with other ion conductors are used to enhance oxygen solubility. It is well known that oxygen solubility is approximately eight times higher in these fluorinated analogs as compared to phosphoric acid based components (Zhang, Ma et al. 2003). The electrocatalyst can be obtained from commercial vendors such as Columbian Chemicals (Marrietta, Ga., USA), Cabot Superior Micro-powders (Albuquerque, N. Mex., USA). The typical weight ratio of the catalyst on carbon support being 30-60% of metal on carbon.

The second step generally involves preparation of slurry using a combination of electrocatalyst in a suspension containing solubilized form of the polymer substrate (structures 1 and 2), ion conducting element in a blend of phosphoric acid, polyphosphoric acid, and analogs of perfluorinated sulfonic acids together with PTFE (Dupont, USA) as a binder. Additionally, pore forming components based on a combination of carbonates and bicarbonates are added in a ratio of 5-10% by weight. The ratio of the components have a variation of 10-30% within choice of each component enabling a total catalyst loading 0.3 to 0.4 mg of Pt or Pt alloy/cm$^2$. The application of the slurry is achieved via a combination or exclusive application of calendaring, screen printing or spraying.

The third step of sintering and drying of the electrode layer is performed after the catalyst is applied in the form of a reaction layer. In this step the electrodes are subjected to a two step process which initially involves drying at 160° C. for about 30 minutes followed by sintering at temperatures in the range of 150-350° C. for a time period in the range of 30 minutes to 5 hrs.

Formation of Membrane Electrode Assembly

To prepare membrane electrode assemblies, a sandwich of anode membrane and cathode electrodes is placed in an appropriate arrangement of gasket materials, typically a combination of polyimide and polytetrafluorethylene (PTFE, Dupont, USA). This is followed by hot pressing with a hydraulic press or other similar device. Pressures in the range of 0.1 to 10 bars are applied with platen temperatures in the range of 150 to 250° C. for time periods typically in the range of 10 to 60 minutes. The prepared membrane electrode assemblies have thickness in the range of 75 to 250 micro meters. This allows for a final assembly of the membrane electrode assembly.

The following non-limiting examples are illustrative of the invention. All documents mentioned herein are incorporated herein by reference.

EXAMPLE 1

Synthesis of 2,5-di(Pyridin-3-yl)benzene-1,4-diol 2,5-Dibromohydroquinone, tetrahydrofuran and 3,4-Dihydro-2H-pyran is added to a degassed flask. The solution is stirred at 0° C. under argon for 15 min. (+−)-Camphor-10-sulfonic acid (b) is added and the solution is stirred at room temperature for 8 hours. The precipitated product is filtered and washed with distilled water in order to remove excess CSA. A small amount of cold Hexane is added for better drying. The bis-(2-Tetrahydro-2H-pyranyl(1)acid)-2,5-dibromobenzene is dried under vacuum and product is obtained at a 90% yield.

Bis-(2-Tetrahydro-2H-pyranyl(1)acid)-2,5-dibromobenzene and distilled tetrahydrofuran is added to a degassed three neck flask fitted with a cooler, an additional funnel with septrum, and a thermometer. Butillithium solution is slowly added to the degassed solution at −80° C. The mixture is lifted for 3 hours at −40° C. Then the mixture is cooled again at −80° C. and trimethyl borate is slowly added. The mixture is lifted under stirring at room temperature for 24 hours. Distilled water is added for 3 hours in order to hydrolyze the boric ester groups. The organic layer is then separated and the organic solvent is removed under reduced pressure. The residue is treated with Hexane for 24 hours. The product 2,5-(Tetrahydro-2H-pyranyl(1)acid)phenyl diboronic acid is filtered and dried at 30° C. under vacuum and the THP-protected diol is obtained at 55% yield.

Tetrahydrofuran and 2M $Na_2CO_3$ are added to a degassed mixture of 3-Bromopyridine, 2,5-(Tetrahydro-2H-pyranyl(1) acid)phenyl diboronic acid, and $Pd(PPh_3)_4$ under a continuous stream of argon. The solution is vigorously stirred at reflux for 4 days under argon. The organic layer is then separated and the organic solvent is removed under reduced pressure. The residue is treated with MeOH, filtered, and dried at 40° C. under vacuum. Thus, the THP-protected diol is obtained in 70% yield.

HCl 37% is added to a solution of the THP-protected diol in THF and MeOH, and the mixture is then stirred at 50° C. for 24 hours. The organic solvent is removed under reduced pressure and a small amount of distilled water is added. The soluble product is filtered in order to remove by-products. Deprotonation is performed using 2M $Na_2CO_3$ and sinking of the product. Filtration, washing with water and cold hexane, and drying at 50° C. under vacuum results in 2,5-di(Pyridin-3-yl)benzene-1,4-diol in 60% yield.

Coupling reactions where two hydrocarbon radicals are coupled with the aid of a metal containing catalyst are used for the synthesis of monomers. One of the synthetic procedures which is followed for the synthesis of the monomer is given below.

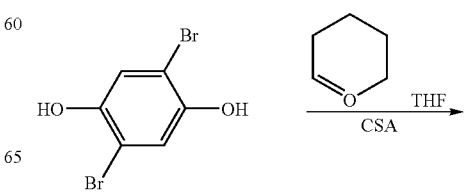

-continued

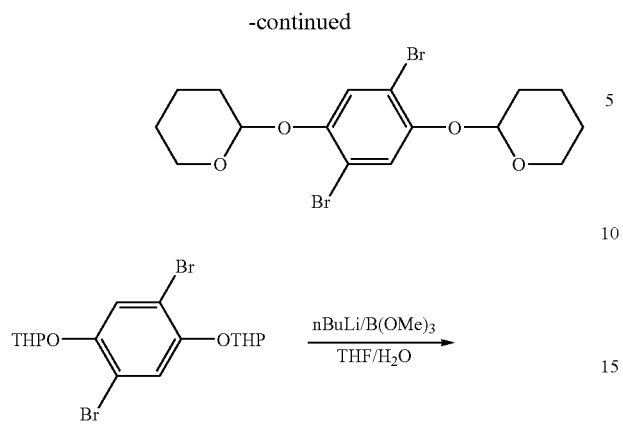

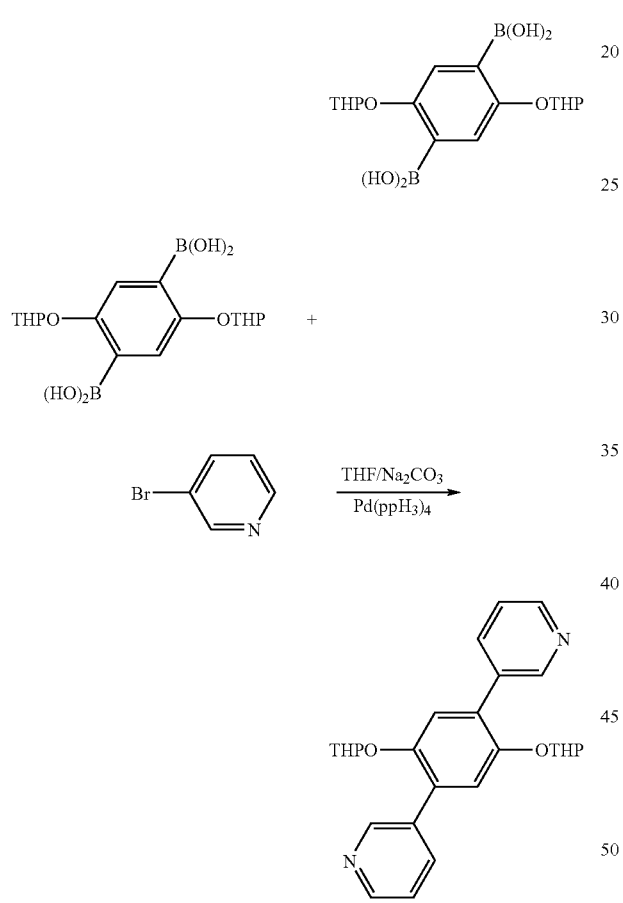

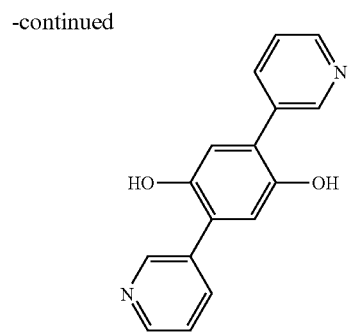

EXAMPLE 2

Synthesis of Copolymer dPPy(50)coPPyPES

Bis-(4-fluorophenyl)sulfone (3.147 mmol, 0.800 g), 2,5-di(Pyridin-3-yl)benzene-1,4-diol (1.573 mmol, 0.415 g), 2,5-Bis(4-hydroxy-phenyl)pyridine (1.573 mmol, 0.414 g), $K_2CO_3$ (3.650 mmol, 0.504 g), DMF (10.0 ml) and Toluene (6.5 ml) are added to a degassed flask equipped with a Dean-Stark trap. The mixture is degassed under Ar and stirred at 150° C. for 24 hours, and then stirred at 180° C. for 48 hours. The obtained viscous product is diluted in DMF and precipitated in a 10-fold excess mixture of MeOH, washed with $H_2O$ and Hexane, and dried at 80° C. under vacuum. The same procedure is followed to produce copolymer dPPy(40)coPPyPES, by varying the feed ratio of the two diols.

EXAMPLE 3

Synthesis of Copolymer dPPy(50)coPPyPO

Bis(4-fluorophenyl)phenylphosphine oxide (2.548 mmol, 0.800 g), 2,5-di(Pyridin-3-yl)benzene-1,4-diol (1.274 mmol, 0.336 g), 2,5-Bis(4-hydroxyphenyl)pyridine (1.274 mmol, 0.335 g), $K_2CO_3$ (2.955 mmol, 0.408 g), DMF (9.0 ml) and Toluene (5.7 ml) are added to a degassed flask equipped with a Dean-Stark trap. The mixture is degassed under Ar and stirred at 150° C. for 24 hours, and then stirred at 180° C. for 8 hours. The obtained viscous product is precipitated in a 10-fold excess mixture of MeOH, washed with $H_2O$ and Hexane, and dried at 80° C. under vacuum. The same procedure is followed to produce copolymers with different 2,5-di(Pyridin-3-yl)benzene-1,4-diol molar percentage, by varying the feed ratio of the two diols.

EXAMPLE 4

Synthesis of Homopolymer dPPyPES

Bis-(4-fluorophenyl)sulfone (2.753 mmol, 0.700 g), 2,5-di(Pyridin-3-yl)benzene-1,4-diol (2.753 mmol, 0.727 g), $K_2CO_3$ (3.194 mmol, 0.441 g), DMF (8.9 ml) and Toluene (5.7 ml) are added to a degassed flask equipped with a Dean-Stark trap. The mixture is degassed under Ar and stirred at 150° C. for 24 hours, and then stirred at 180° C. for 4 days. The obtained product is precipitated in a 10-fold excess mixture of MeOH, washed with $H_2O$ and Hexane, and dried at 80° C. under vacuum. The same procedure is followed to produce homopolymers with different 2,5-di(Pyridin-3-yl)benzene-1,4-diol molar percentage, by varying the feed ratio of the two reactants.

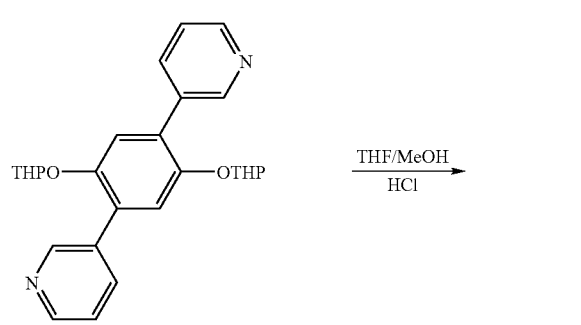

EXAMPLE 5

Synthesis of Homopolymer dPPyPO

Bis(4-fluorophenyl)phenylphosphine oxide (2.229 mmol, 0.700 g), 2,5-di(Pyridin-3-yl)benzene-1,4-diol (2.229 mmol, 0.589 g), $K_2CO_3$ (2.586 mmol, 0.357 g), DMF (7.8 ml) and Toluene (5.0 ml) are added to a degassed flask equipped with a Dean-Stark trap. The mixture is degassed under Ar and stirred at 150° C. for 24 hours, and then stirred at 180° C. for 2 days. The obtained product is precipitated in a 10-fold excess mixture of MeOH, washed with $H_2O$ and Hexane, and dried at 80° C. under vacuum. The same procedure is followed to produce homopolymers with different 2,5-di(Pyridin-3-yl)benzene-1,4-diol molar percentage, by varying the feed ratio of the two reactants.

EXAMPLE 6

Membrane Electrode Assembly

Carbon paper (Toray TGP H-120) is initially wet proofed by dipping in a TFE-30 dispersion (Dupont, USA). For this, a typical loading of 0.6-1.5 $mg/cm^2$ is used. The gas diffusion layer is applied using a slurry comprising of Ketjen black (Engelhard, USA) with a surface area of 250 $m^2/gm$, TFE –30 dispersion (Dupont, USA), ammonium carbonate in a ratio of 60:30:10% respectively. After adequate stirring, this slurry is calendared (Gravure coaters from Euclid coating systems (Bay City, Mich., USA) on to the wet proofed carbon paper using a calendaring machine to a thickness of about 50-100 micro meters. After the gas diffusion layer is obtained, it is next sintered in air using a muffle furnace with adequate venting at a temperature in the range of 100-200° C. for 10 to 15 hours.

The reaction layer is next deposited using a choice of individual anode and cathode electrocatalysts. For this, a separate slurry is prepared containing the electrocatalyst, binder (TFE-30, dispersion from Dupont, USA), ammonium bicarbonate, and a blend of solubilized form of the polymer electrolytes (structures 1 and 2, either alone or in a combined form) and both volatile and non volatile acid (i.e., poly fluorinated sulfonic acid, PFSA in a combination with phosphoric acid) in a ratio ranging between 1:1 to 1:5. This slurry is calendared onto the gas diffusion side of the electrode to make the individual anode and cathode electrodes using the same procedure described above with the aid of the coating machine (Gravure coaters from Euclid coating systems (Bay City, Mich., USA). Additionally, the reaction layer in the cathode electrode also contains 5% by weight ammonium carbonate to afford pore formation.

Acid doped blended polymer membranes with a combination of structures 1 and 2 as described in earlier examples is next used to prepare the membrane electrode assembly. For this, a die set up is used with Teflon (Dupont, USA) and polyimide gaskets to achieve the appropriate compression and sealing in the single cell. Hot pressing conditions are 150-250° C. and 10 bar for 25 minutes.

The membrane electrode assembly so prepared was tested in a 5 $cm^2$ single cell (Fuel Cell technologies, Albuquerque, N. Mex., USA) with the aid of a potentiostat (Autolab PGSTAT-30) in conjunction with a current booster (10 A). Polarization measurements were conducted at 170-200° C., 1.5 bars, $H_2$/Air (2:2 stoichiometric flow). Steady state current was also monitored for stability studies up to 400 hrs at a constant potential of 0.5V vs. RHE.

REFERENCES

Antoine, O. and R. Durand (2001). "In situ Electrochemical Deposition of Pt Nanoparticles on Carbon and Inside Nafion." *Electrochem. and Solid-State Lett.* 4(5): A55.

Cha, S. Y. and W. M. Lee (1999). *J. Electrochem. Soc.* 146: 4055.

Chun, Y. G., C. S. Kim, et al. (1998). *J. Power Sources* 71: 174.

Cunningham, N., E. Irissou, et al. (2003). "PEMFC Anode with Very Low Pt Loadings Using Pulsed Laser Deposition." *Electrochem. and Solid-State Lett.* 6(7): A125-A128.

Debe, M. K., G. M. Haugen, et al. (1999). Catalyst for membrane electrode assembly and method of making. US patent: 20.

Debe, M. K., J. M. Larson, et al. (1999). Membrane electrode assemblies. US patent: 86.

Debe, M. K., T. N. Pham, et al. (1999). Process of forming a membrane electrode. US patent: 54.

Debe, M. K., R. J. Poirier, et al. (1999). Membrane electrode assembly. US patent: 42.

Figueroa, J. C. (2005). Fabrication and use of electrodes and other fuel cell components having ultra low catalyst loadings coated thereon. WO Pat., (E.I. Dupont de Nemours and Company, USA). 24 pp.

Haug, A. T. (2002). Development of low-loading, carbon monoxide tolerant PEM fuel cell electrodes: 185.

Hirano, S., J. Kim, et al. (1997). "High performance proton exchange membrane fuel cells with sputter-deposited Pt layer electrodes." *Electrochim. Acta* 42(10): 1587-1593.

Hirvonen, J. K. (2004). "Ion beam assisted deposition." *Mat Res. Soc. Symposium Proceedings* 792 (Radiation Effects and Ion-Beam Processing of Materials): 647-657.

Hoshino, T., K. Watanabe, et al. (2003). "Development of three-dimensional pattern-generating system for focused-ion-beam chemical-vapor deposition." *J. Vac. Sci. Tech., B: Microelectronics and Nanometer Structures-Processing, Measurement and Phenomena* 21(6): 2732-2736.

Kotov, D. A. (2004). "Broad beam low-energy ion source for ion-beam assisted deposition and material processing." *Rev. Sci. Inst.* 75(5, Pt. 2): 1934-1936.

Kumar, G. S. and S. Parthasarathy (1998). A method of manufacture of high performance fuel cell electrodes with very low platinum loading. IN Pat., (India). 13 pp.

Mosdale, R., M. Wakizoe, et al. (1994). "Fabrication of electrodes for proton exchange-membrane fuel cells (PEM-FCs) by spraying method and their performance evaluation." *Proc.-Electrochem. Soc.* 94-23 (Electrode Materials and Processes for Energy Conversion and Storage): 179-89.

Mukerjee, S., S. Srinivasan, et al. (1993). "Effect of sputtered film of platinum on low platinum loading electrodes on electrode. Kinetics of oxygen reduction in proton exchange membrane fuel cells." *Electrochimica. Acta* 38(12): 1661-9.

Mukerjee, S. and R. C. Urian (2002). "Bifunctionality in Pt alloy nanocluster electrocatalysts for enhanced methanol oxidation and CO tolerance in PEM fuel Cells: electrochemical and in situ synchrotron spectroscopy." *Electrochim. Acta* 47: 3219-3231.

Murthi, V. S., R. C. Urian, et al. (2004). "Oxygen Reduction Kinetics in Low and Medium Temperature Acid Environment: Correlation of Water Activation and Surface Properties in Supported Pt and Pt Alloy Electrocatalysts." *J. Phys. Chem. B* 108(30): 11011-11023.

Popov, B. N. (2004). "Electrodeposition of alloys and composites with superior corrosion and electrocatalytic properties." *Plating and Surface Finishing* 91(10): 40-49.

Qi, Z. and A. Kaufman (2003). "Low Pt loading high performance cathodes for PEM fuel cells." *J. Power Sources* 113(1): 37-43.
A simple direct mixing of carbon-supported catalysts with Nafion without adding any addnl. org. solvents was used to make electrodes for oxygen redn. in PEM fuel cells. For E-TEK 20% Pt/C, a Nafion content of 30% in the catalyst layer exhibited the best performance. Electrode dried from 90 to 150 DegC showed little difference in performance. Highest power densities increased almost linearly with cell temp., and values of 0.52, 0.60, 0.63, and 0.72 W/cm2 were achieved at 35, 50, 60, and 75 DegC, resp., for a cathode with a Pt loading of 0.12 mg/cm2 and operated using air at ambient pressure. A max. performance was achieved with Pt loadings of 0.20+-0.05 and 0.35+-0.05 mg/cm2 for 20 and 40% Pt/C, resp., while the max. performance using 40% Pt/C was only slightly better than that using 20% Pt/C. A Nafion/carbon sublayer with up to 30% Nafion content added between ELAT and the catalyst layer did not show any effect on performance. [on SciFinder (R)]

Shao, Z.-G., B.-L. Yi, et al. (2000). "New method for the preparation of the electrodes with very low platinum loading used in proton exchange membrane fuel cell." *Dianhuaxue* 6(3): 317-323.

Taylor, E. J., E. B. Anderson, et al. (1992). "Preparation of high-platinum-utilization gas diffusion electrodes for proton-exchange-membrane fuel cells." *J. Electrochem. Soc.* 139(5): L45-L46.

Taylor, E. J. and M. E. Inman (2000). Electrodeposition of catalytic metals using pulsed electric fields. WO Pat., (Faraday Technology, Inc., USA). 41 pp.

Teliska, M., V. S. Murthi, et al. (2003). *In-Situ Determination of O(H) Adsorption on Pt and Pt based Alloy Electrodes using X-ray Absorption Spectroscopy*. Fundamental Understanding of Electrode Processes, Proc.-Electrochem. Soc, Pennington, N.J.

Teliska, M., V. S. Murthi, et al. (2005). "Correlation of Water Activation, Surface Properties, and Oxygen Reduction Reactivity of Supported Pt-M/C Bimatallic Electrocatalysts using XAS." *J. Electrochem. Soc.* 152: A2159.

Tsumura, N., S. Hitomi, et al. (2003). "Development of Ultra-Low Pt—Rhu Binary Alloy Catalyst Loading Gas Diffusion Electrode for PEFC." *GS News Technical Report* 62(1): 21-25.

Uchida, M., Y. Fukuoka, et al. (1998). "Improved preparation process of very-low-platinum-loading electrodes for polymer electrolyte fuel cells." *J. Electrochem. Soc.* 145(11): 3708-3713.

Wilson, M. S. and S. Gottesfeld (1992). *J. App. Electrochem.* 22: 1.

Wilson, M. S. and S. Gottesfeld (1992). "High performance catalyzed membranes of ultra-low platinum loadings for polymer electrolyte fuel cells." *J. Electrochem Soc.* 139(2): L28-L30.

Witham, C. K., W. Chun, et al. (2000). "Performance of direct methanol fuel cells with sputter-deposited anode catalyst layers." *Electrochem. and Solid-State Lett.* 3(11): 497-500.

Witham, C. K., T. I. Valdez, et al. (2001). "Methanol oxidation activity of co-sputter deposited Pt—Ru catalysts." *Proc.-Electrochem. Soc.* 2001-4 (Direct Methanol Fuel Cells): 114-122.

Xiong, L. and A. Manthiram (2005). "High performance membrane-electrode assemblies with ultra-low Pt loading for proton exchange membrane fuel cells." *Electrochimica Acta* 50(16-17): 3200-3204.

Yamafuku, T., K. Totsuka, et al. (2004). "Optimization of polymer electrolyte distribution of ultra-low platinum loading electrode for PEFC." *GS News Technical Report* 63(1): 23-27.

Zhang, L., C. Ma, et al. (2003). "Oxygen permeation studies on alternative proton exchange membranes designed for elevated temperature operation." *Electrochim. Acta* 48: 1845-1859.

Development and Characterization of Novel Proton Conducting Aromatic Polyether Type Copolymers Bearing Main and Side Chain Pyridine Groups
Maria Geormezi, Nora Gourdoupi
Advent Technologies, Patras Science Park, Patras 26504, Greece

What is claimed is:

1. A process for preparing a compound comprising the general structural formula:

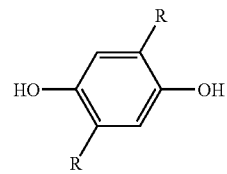

wherein R is selected from the group consisting of

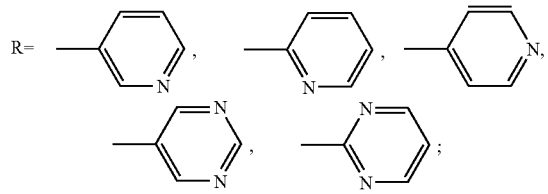

or a salt thereof, comprising coupling a compound of the formula:

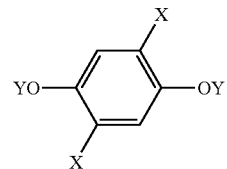

wherein X is a metal or metalloid atom or an electrophile or leaving group; and
Y is H or a protecting group;
with a compound selected from:

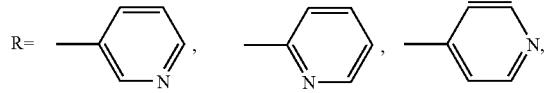

-continued

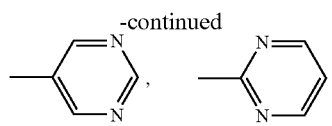

in which

Z is a metal or metalloid atom or an electrophile or leaving group, in the presence of a metal containing catalyst.

2. The process according to claim 1, wherein the coupling reaction is a Suzuki cross coupling reaction of an aryl-boronic acid with an aryl-halide catalyzed by a palladium(0) complex.

3. An aromatic polyether copolymer having the general structural formula:

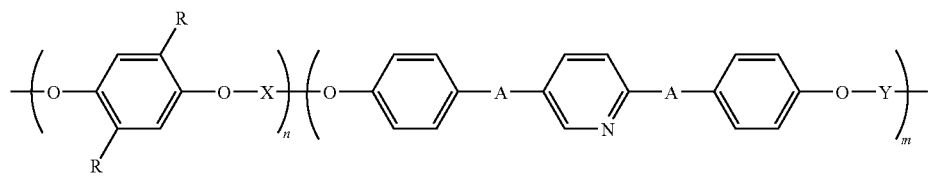

wherein R is selected from the group consisting of:

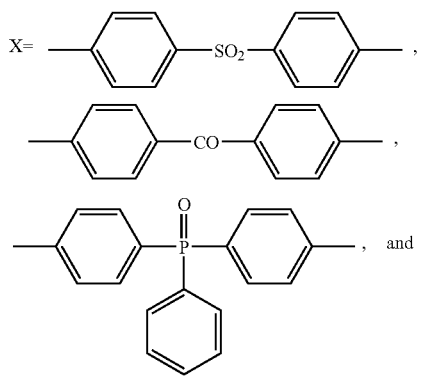

X is selected from the group consisting of:

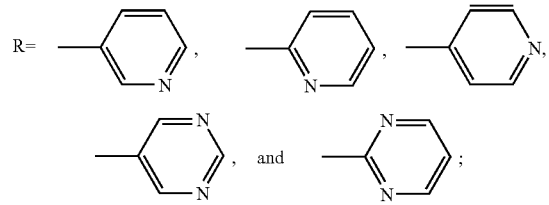

Y is selected from the group consisting of:

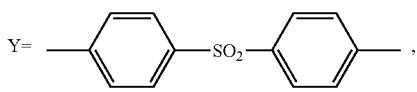

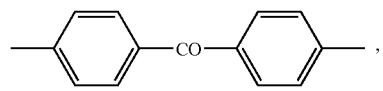

-continued

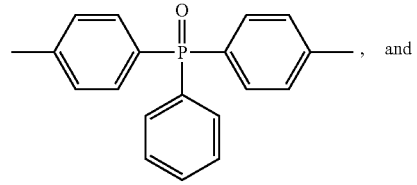, and

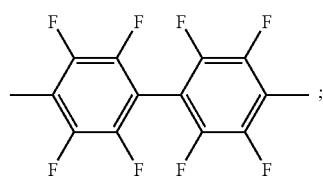;

n and m are positive integers;

and A is selected from the group consisting of:

A=—CH$_2$, —CF$_2$, -phenyl, and none; or a salt thereof.

4. An aromatic polyether having the general structural formula:

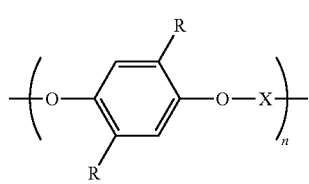

wherein

R is selected from the group consisting of:

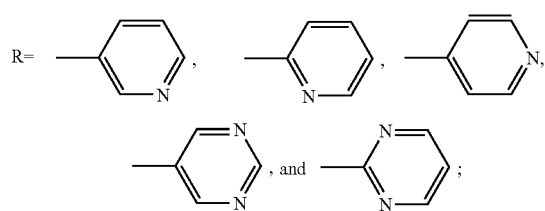

n is a positive integer;
and
X is selected from the group consisting of:

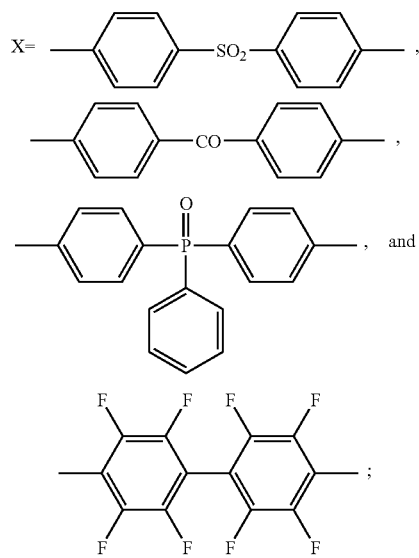

or a salt thereof.

5. The polymer or copolymer of claim 3 or 4, wherein the polymer or copolymer is a block copolymer, random copolymer, periodic copolymer and/or alternating polymer.

6. A process for preparing the polymer or copolymer of claim 3 or 4, wherein the process comprises polycondensing monomers at high temperature under conditions such that the polymer or copolymer is formed.

7. A process for preparing the polymer or copolymer of claim 3 or 4, wherein the process comprises reacting an aromatic difluoride with a compound comprising the general structural formula:

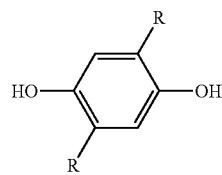

wherein R is selected from the group consisting of

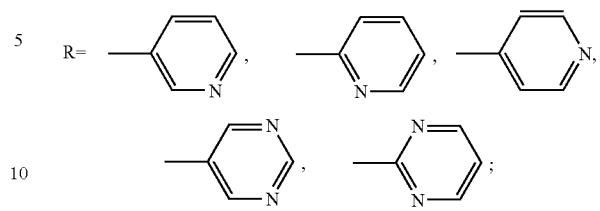

or a salt thereof.

8. The process of claim 7, wherein the aromatic difluoride is bis-(4-fluorophenyl)sulfone, bis-(4-fluorophenyl)phenylphosphine oxide, 4,4'-difluorobenzophenone, or decafluorobipheynyl.

9. A blend of copolymers or homopolymers, the blend prepared by mixing a dimethylacetamide solution of the copolymer of claim 3 and a dimethylacetamide solution of an aromatic polyether having the general structural formula:

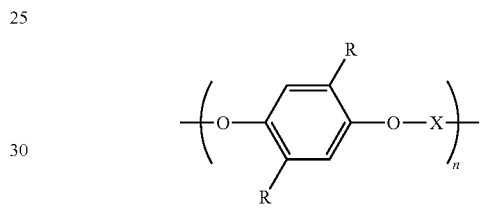

wherein
R is selected from the group consisting of:

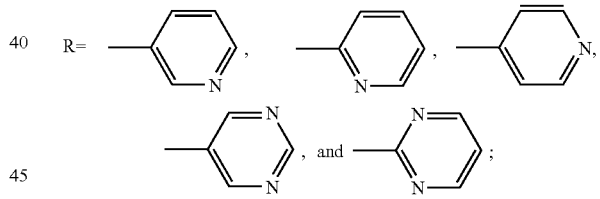

n is a positive integer;
and
X is selected from the group consisting of:

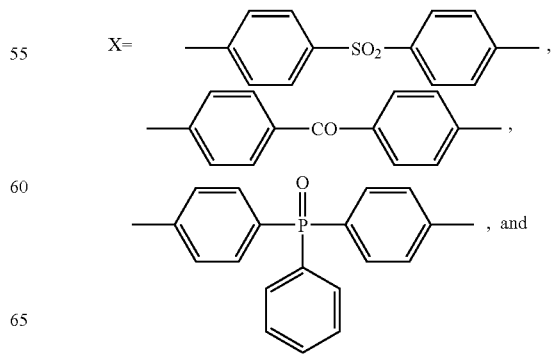

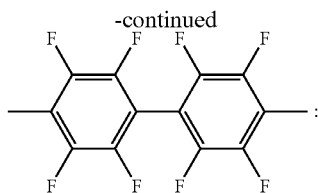

or a salt thereof,
in a predetermined ratio.

10. The blend of claim 9, wherein the predetermined ratio is about 50/50.

11. A composition comprising a slurry mixture of a polymer, copolymer, or blend of claim 3 or 4 and a polar aprotic solvent.

12. A method of preparing a catalyst, the method comprising:
   (a) depositing a layer of a composition of claim 11 by calendaring, screen printing or spraying on a hydrophobic layer; and
   (b) drying and sintering the layer deposited in step (a), thereby preparing the catalyst.

13. A layered membrane electrode assembly, comprising:
   a substrate;
   a gas diffusion layer;
   a reaction layer; and
   a membrane electrolyte comprising the polymer or copolymer of claim 2 or 3.

14. A layered membrane electrode assembly, comprising:
   a substrate;
   a gas diffusion layer;
   a reaction layer; and
   a membrane electrolyte comprising the blend of claim 8.

15. The layered membrane electrode assembly of claim 12 wherein the reaction layer comprises a catalyst and a slurry mixture of a polar aprotic solvent and
   (a) an aromatic polyether having the general structural formula:

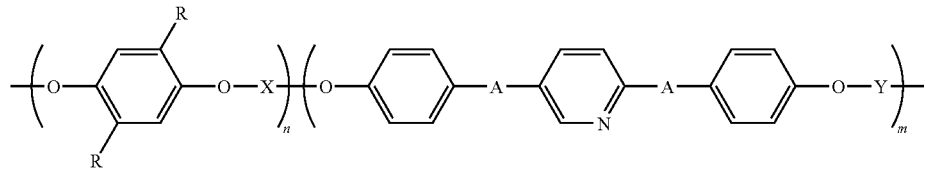

wherein R is selected from the group consisting of:

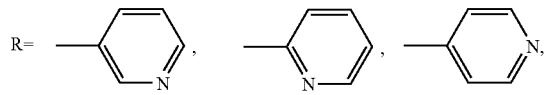

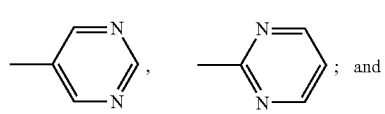; and

X is selected from the group consisting of:

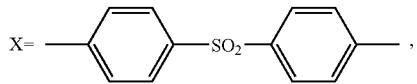,

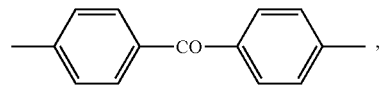,

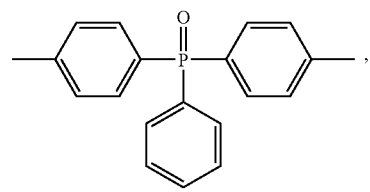,

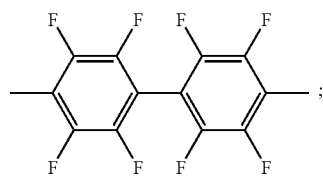;

Y is selected from the group consisting of:

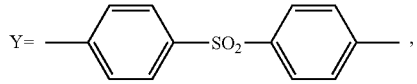,

-continued

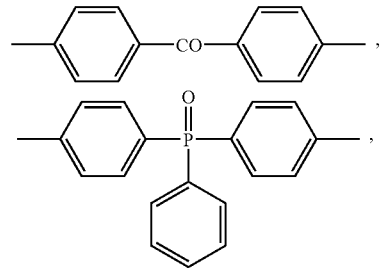

-continued

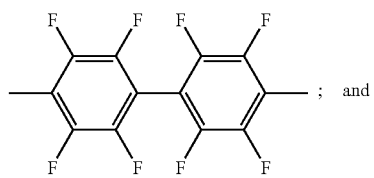 ; and

A is selected from the group consisting of:
A=—CH$_2$, —CF$_2$, -phenyl, none; or a salt thereof; or
(b) an aromatic polyether comprising the general structural formula:

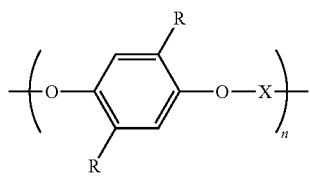

wherein R is selected from the group consisting of:

R= 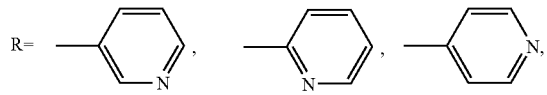 ,

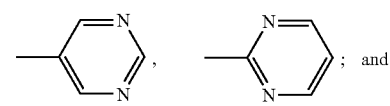 ; and

X is selected from the group consisting of:

X= 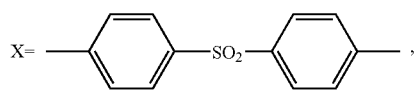 ,

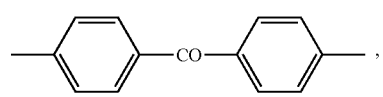 ,

-continued

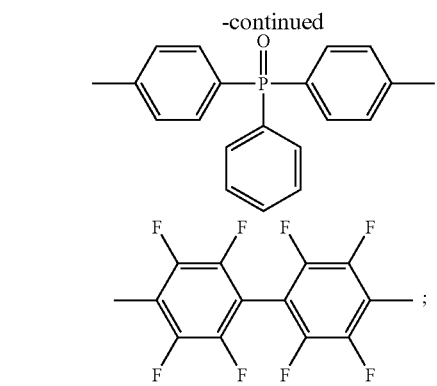

or a salt thereof; or
the blend prepared by mixing a dimethylacetamide solution of (a) and a dimethylacetamide solution (b) in a predetermined ratio.

16. The layered membrane electrode assembly of claim 14 wherein the reaction layer comprises a catalyst and a slurry mixture of a polar aprotic solvent and
(a) an aromatic polyether having the general structural formula:

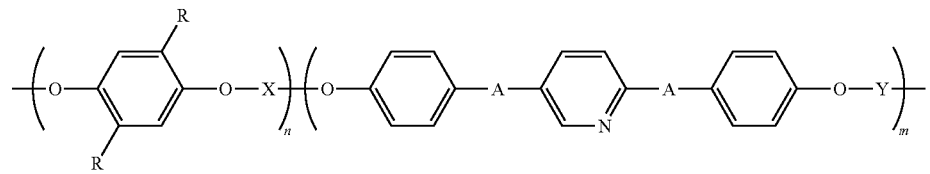

wherein R is selected from the group consisting of:

R= 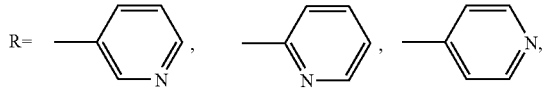 ,

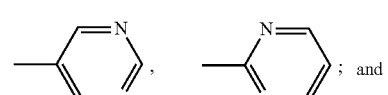 ; and

X is selected from the group consisting of:

X= 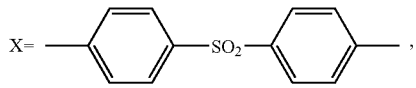 ,

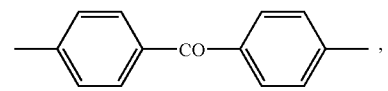 ,

-continued

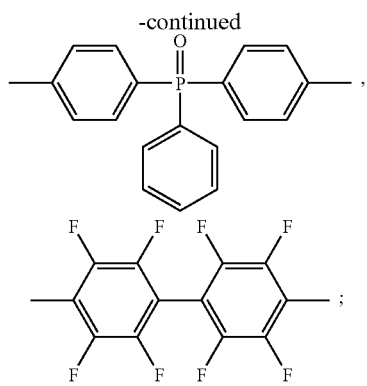

Y is selected from the group consisting of:

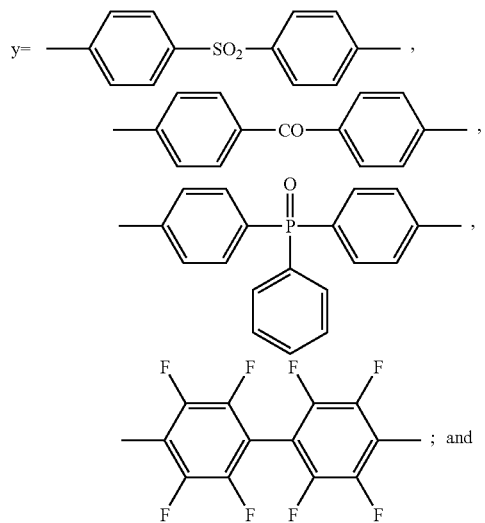

A is selected from the group consisting of:
A=—CH$_2$, —CF$_2$, -phenyl, none; or a salt thereof; or
(b) an aromatic polyether comprising the general structural formula:

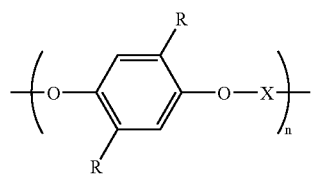

wherein R is selected from the group consisting of:

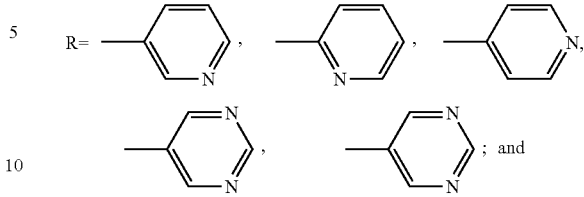

X is selected from the group consisting of:

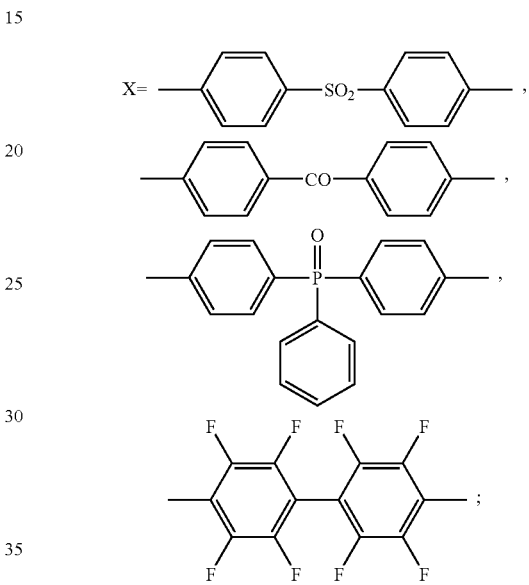

or a salt thereof; or
the blend prepared by mixing a dimethylacetamide solution of (a) and a dimethylacetamide solution (b) in a predetermined ratio.

17. The layered membrane electrode assembly of claim 13 wherein the polymer or copolymer is a block copolymer, random copolymer, periodic copolymer and/or alternating polymer.

18. The layered membrane electrode assembly of claim 14 wherein the polymer or copolymer is a block copolymer, random copolymer, periodic copolymer and/or alternating polymer.

* * * * *